(12) United States Patent
Zhang et al.

(10) Patent No.: US 12,151,317 B2
(45) Date of Patent: Nov. 26, 2024

(54) PROTECTIVE APPARATUS

(71) Applicant: CONTEMPORARY AMPEREX TECHNOLOGY (HONG KONG) LIMITED, Hong Kong (CN)

(72) Inventors: Yongli Zhang, Ningde (CN); Zhihua Wen, Ningde (CN); Yunru Shi, Ningde (CN); Cong Zhang, Ningde (CN); Yitai Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 30 days.

(21) Appl. No.: 18/114,173

(22) Filed: Feb. 24, 2023

(65) Prior Publication Data

US 2023/0271280 A1     Aug. 31, 2023

(30) Foreign Application Priority Data

Feb. 28, 2022    (CN) .......................... 202220411711.8

(51) Int. Cl.
    *B23K 37/00*       (2006.01)
    *B23K 37/06*       (2006.01)
               (Continued)

(52) U.S. Cl.
    CPC ........... *B23K 37/06* (2013.01); *H01M 50/169* (2021.01); *H01M 50/516* (2021.01); *H01M 50/566* (2021.01)

(58) Field of Classification Search
    CPC .... B23K 26/70; B23K 2101/36; B23K 26/21; B23K 26/22; B23K 26/702; B23K 37/0426; H01M 50/516
    See application file for complete search history.

(56) References Cited

U.S. PATENT DOCUMENTS

2020/0365872 A1* 11/2020 Phares ................ H01M 4/0419
2021/0039195 A1* 2/2021 Jost ....................... B23K 26/082
(Continued)

FOREIGN PATENT DOCUMENTS

CN       202028851 U    11/2011
CN       103612028 A     3/2014
(Continued)

OTHER PUBLICATIONS

The Extended European Search Report received in the corresponding European Application 23157060.7, mailed Jul. 20, 2023.
(Continued)

*Primary Examiner* — Erin B Saad
(74) *Attorney, Agent, or Firm* — Kilpatrick Townsend & Stockton LLP (57) ABSTRACT

This application relates to a protective apparatus. The protective apparatus is configured to protect a to-be-welded part, the to-be-welded part includes a welding region, and the protective apparatus includes a base and a protective mechanism. The base is configured for embedding the to-be-welded part. The protective mechanism is connected to the base. The protective mechanism includes a welding hole, where the welding hole is provided corresponding to the welding region; and a surface of the protective mechanism facing the welding hole is provided with a thermally conductive coating, where the thermally conductive coating is configured to guide substances formed in welding the to-be-welded part to slide down along the surface of the thermally conductive coating. The protective apparatus in this application can improve welding quality of the welding region, thereby enhancing performance of the to-be-welded part.

9 Claims, 6 Drawing Sheets

(51) Int. Cl.
    *H01M 50/169*     (2021.01)
    *H01M 50/516*     (2021.01)
    *H01M 50/566*     (2021.01)

(56) References Cited

U.S. PATENT DOCUMENTS

| | | | | |
|---|---|---|---|---|
| 2023/0271278 A1* | 8/2023 | Zhang | ................... | B23K 20/10 228/25 |
| 2023/0271280 A1* | 8/2023 | Zhang | ................... | F16P 1/06 228/21 |

FOREIGN PATENT DOCUMENTS

| | | | |
|---|---|---|---|
| CN | 111378360 | A | 7/2020 |
| JP | 2014136254 | A | 7/2014 |
| JP | 2019067705 | A | 4/2019 |
| JP | 2020093301 | A | 6/2020 |
| KR | 20130131658 | A | 12/2013 |
| KR | 20160104931 | A | 9/2016 |

OTHER PUBLICATIONS

Communication pursuant to Article 94(3) EPC received in the corresponding European Application 23157060.7, mailed Oct. 18, 2023.

* cited by examiner

PROTECTIVE APPARATUS

CROSS REFERENCE TO RELATED APPLICATION

This application claims priority to Chinese Patent Application No. 202220411711.8, entitled "PROTECTIVE APPARATUS" filed on Feb. 28, 2022, which is incorporated herein by reference in its entirety.

TECHNICAL FIELD

This application relates to the field of welding technologies, and in particular, to a protective apparatus.

BACKGROUND

With wide application of metals in aerospace, automobile manufacturing, power plant equipment, petrochemical equipment, bridges, and other fields, the welding technologies, as common technologies in the field of equipment manufacturing, have become one of the key technologies affecting application of metals in the field of device manufacturing.

Therefore, how the welding quality of products is improved has become an urgent problem to be solved.

SUMMARY

This application provides a protective apparatus to improve the welding quality of products.

The protective apparatus proposed in this application is configured to protect a to-be-welded part, where the to-be-welded part includes a welding region, and the protective apparatus includes a base and a protective mechanism. The base is configured for embedding the to-be-welded part. The protective mechanism is connected to the base. The protective mechanism includes a welding hole, where the welding hole is provided corresponding to the welding region; and a surface of the protective mechanism facing the welding hole is provided with a thermally conductive coating, where the thermally conductive coating is configured to guide substances formed in welding the to-be-welded part to slide down along the surface of the thermally conductive coating.

In the foregoing technical solution, the surface of the protective mechanism facing the welding hole is provided with the thermally conductive coating. Therefore, after substances such as spatters formed in a welding process contact the thermally conductive coating, heat can be transferred to the thermally conductive coating and the substances are rapidly cooled and solidified, and then under the action of gravity, the cooled and solidified substances can slide down the heat-conducting coating with smooth surface, thereby reducing the risk of the substances such as spatters adhering to the thermal coating, and prolonging the service life of the protective mechanism. In this way, the spatters hardly interfere with the welding process of a welding device, improving the welding effect. In addition, the substances slipping into the welding region can still be used as welding materials for welding, which reduces the possibility of false welding and can further improve the welding quality of the welding region, thereby improving the performance of the to-be-welded part.

In some embodiments, the thermally conductive coating is a metal ceramic coating or a non-metal ceramic coating.

In the embodiments of this application, with high thermal conductivity, the ceramic coating can rapidly cool and solidify the substances such as spatters. In addition, the ceramic coating has excellent high-temperature resistance, therefore can withstand high temperatures in the welding process and is less likely to deform in the welding process, and therefore can protect other parts of the protective mechanism, reducing the frequency of replacing the protective apparatus. In addition, the ceramic coating has an excellent self-cleaning function.

In some embodiments, the protective mechanism includes a protective body and a connecting member. The protective body is provided with a welding hole. The connecting member includes a connecting piece and a driving mechanism connected to the base, where the connecting piece is connected to the protective body and movably connected to the base, and the driving mechanism is drivingly connected to the connecting piece and configured to drive the connecting piece to move relative to the base so as to drive the protective body to move toward or away from the to-be-welded part.

In the embodiments of this application, provision of the driving mechanism to drive the connecting piece to drive the protective body to move allows accurate control on a moving distance of the protective body. Before welding, the protective body is driven to move toward the to-be-welded part to be in contact with the to-be-welded part, and after the welding is completed, the protective body is driven to move away from the to-be-welded part.

In some embodiments, the protective body includes a body portion and limiting portions. The body portion includes two end portions opposite each other and the welding hole located between the two end portions, where the welding hole runs through the body portion. The limiting portions are connected to and protrude from the end portions, where the limiting portions are configured to limit the to-be-welded part.

In the embodiments of this application, the limiting portions protruding from the end portions to limit the to-be-welded part can reduce the risk of movement of the to-be-welded part, thereby improving the welding accuracy of the to-be-welded part.

In some embodiments, the to-be-welded part includes a protrusion protruding from the welding region; and the body portion includes an escape portion, where the escape portion is provided corresponding to the protrusion to allow at least part of the protrusion to be embedded into the escape portion.

In the embodiments of this application, the escape portion is provided corresponding to the protrusion to allow at least part of the protrusion to be embedded into the escape portion. In this way, the body portion can be closer to the surface of the to-be-welded part, the protrusion hardly interferes with the welding process, and most substances such as spatters splash into the welding hole and slide down.

In some embodiments, the connecting piece includes a first connecting piece and two second connecting pieces. The first connecting piece is connected to the protective body, and the first connecting piece is drivingly connected to the driving mechanism. The two second connecting pieces are respectively connected, at one end, to two ends of the first connecting piece, and the two second connecting pieces are movably connected, at the other end, to the base. The driving mechanism is located between the two second connecting pieces.

In the embodiments of this application, the driving mechanism is located between the two second connecting pieces, and the two ends of the first connecting piece are movably connected to the base through the two second connecting pieces respectively. When the driving mechanism drives the first connecting piece to move, the two ends of the first connecting piece apply action force to the two second connecting pieces respectively, and correspondingly, the two ends of the first connecting piece receive reaction force from the two second connecting pieces respectively. During the movement of the first connecting piece, the two ends of the first connecting piece are subject to basically even forces, and therefore the movement is stable, further improving the accuracy of a moving distance.

In some embodiments, the two second connecting pieces are respectively connected, at the other end, to two opposite outer surfaces of the base, and the driving mechanism is disposed in the base. In the embodiments of this application, provision of the driving mechanism in the base can reduce interference of the movement of the second connecting pieces on the driving mechanism.

In some embodiments, the base includes a guide rail, and the second connecting piece includes a moving groove corresponding to the guide rail. In the embodiments of this application, the second connecting piece can move along the guide rail and therefore the movement is stable, improving the accuracy of the moving distance.

In some embodiments, the base includes a main body and three extensions protruding from the main body toward a same direction. The three extensions include a first extension plate and two opposite second extension plates, and the first extension plate is disposed between the two second extension plates. The main body, the first extension plate, and the two second extension plates enclose an accommodating cavity with an opening, where the accommodating cavity is used to accommodate the to-be-welded part, and the connecting piece covers the opening.

In the embodiments of this application, the three extensions protruding from the main body toward a same direction facilitate embedding of the to-be-welded part into the accommodating cavity. The first extension plate and the two extension plates are all of a plate structure. With this simple structure, the extension plates are easy to assemble.

In some embodiments, a cross-sectional area of the welding hole gradually decreases in a direction toward the welding region, where the direction toward the welding region is parallel to a normal to the cross-sectional area.

In the embodiments of this application, the cross-sectional area of the welding hole gradually decreases in a direction toward the welding region, so that on one hand, the welding hole fits a welding joint of a welding device, and on the other hand, the welding hole of this form can prevent interference to a non-welding region.

BRIEF DESCRIPTION OF DRAWINGS

The following describes features, advantages, and technical effects of example embodiments of this application with reference to the accompanying drawings.

The accompanying drawings may not be drawn to scale.

REFERENCE SIGNS IN THE ACCOMPANYING DRAWINGS 1. protective apparatus;
10. base; 11. guide rail; 12. main body; 13. extension; 131. first extension plate; 132. second extension plate; 133. accommodating cavity;
20. protective mechanism; 201. welding hole; 21. thermally conductive coating;
22. protective body; 221. body portion; 2211. end portion; 222. limiting portion; 223. escape portion;
23. connecting member;
231. connecting piece; 2311. first connecting piece; 2312. second connecting piece; 23121. moving groove;
232. driving mechanism;
2. battery cell; 210. housing assembly; 211. housing; 212. end cover; 213. electrode terminal; 220. electrode assembly;
3. welding device.

DESCRIPTION OF EMBODIMENTS

The following further describes implementations of this application in detail with reference to accompanying drawings and embodiments. The detailed description of the following embodiments and the accompanying drawings are used to exemplarily illustrate the principle of this application, but cannot be used to limit the scope of this application, that is, this application is not limited to the described embodiments.

In the descriptions of this application, it should be noted that, unless otherwise stated, "a plurality of" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first" and "second" are merely intended for a purpose of description, and shall not be understood as an indication or implication of relative importance. "Vertical" means being vertical with an allowable range of error other than being strictly vertical. "Parallel" means being parallel with an allowable range of error other than being strictly parallel.

In the descriptions of this application, it should be further noted that unless otherwise specified and defined explicitly, the terms "installment", "link", and "connection" should be understood in their general senses. For example, the terms may be a fixed connection, a detachable connection, or an integrated connection, or may be a direct connection, or an indirect connection through an intermediate medium. Persons of ordinary skill in the art can understand specific meanings of these terms in this application based on specific situations.

In this application, "a plurality of" means more than two (inclusive).

The battery cell in the application may include a lithium-ion secondary battery cell, a lithium-ion primary battery cell, a lithium-sulfur battery cell, a lithium-sodium-ion battery cell, a sodium-ion battery cell, a magnesium-ion battery cell, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The inventors have found that, during the production of a device such as a battery cell, a welding device is inevitably used to connect components in the device, for example, to weld an end cover of a battery cell. In the welding process, influenced by a high temperature and external gas, a metal has a sharp temperature rise at local and melts, and produces substances such as spatters. The spatters tend to splash around and scatter, and after scattering and cooling, the spatters may adhere to the surface of the battery cell, or even fall into the housing, decreasing the performance of the battery cell. To reduce impact of spatters on the end cover, the inventors considered to provide a protective apparatus between the welding device and the end cover. One end of the protective apparatus is opposite the battery cell, and the other end thereof is opposite the welding device. However, in the welding process, the spatters may adhere to the surface of the protective apparatus, thereby causing the spatters to accumulate on the protective apparatus. The spatters may deteriorate the welding effect. For example, the spatters block a laser beam of the welding device from emitting onto the surface of the end cover, resulting in poor welding performance of the battery cell.

To resolve the foregoing problems found by the inventors, the inventors have improved the structure of the protective apparatus. The following further describes the embodiments of this application.

For better understanding of this application, the following describes the embodiments of this application with reference to FIG. 1 to FIG. 6.

Figure 1:
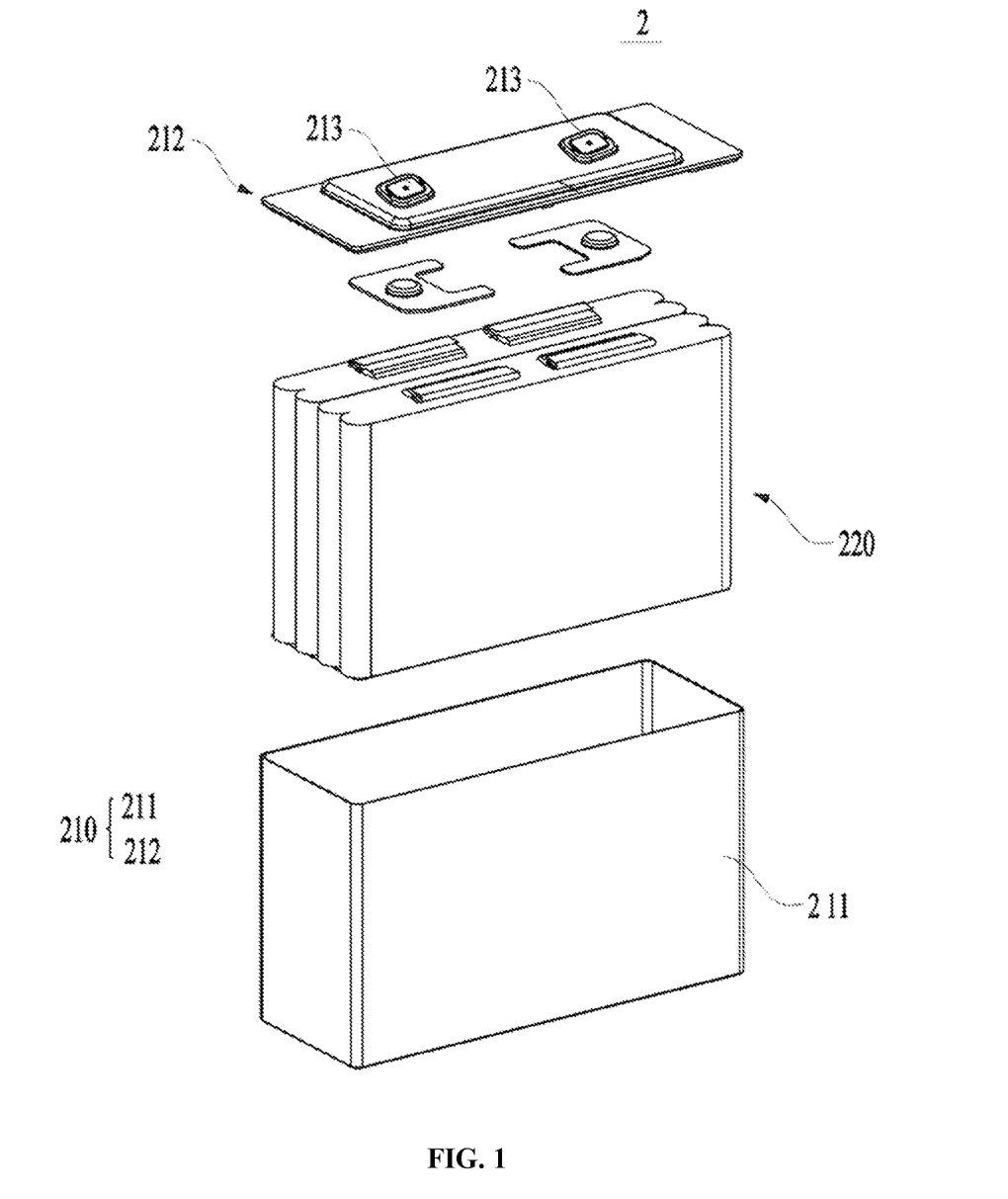
FIG. 1 is a schematic exploded view of a battery cell according to some embodiments of this application.
Figure 2:
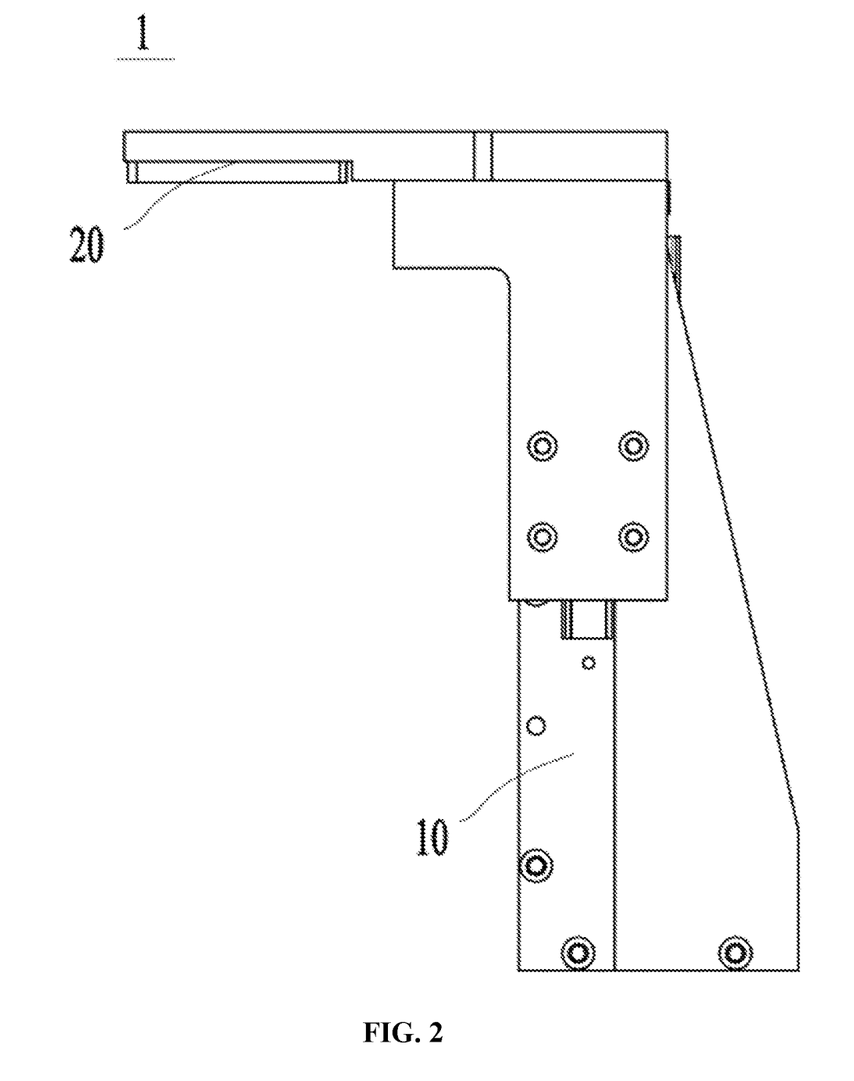
FIG. 2 is a schematic structural diagram of a protective apparatus according to some embodiments of this application.
Figure 3:
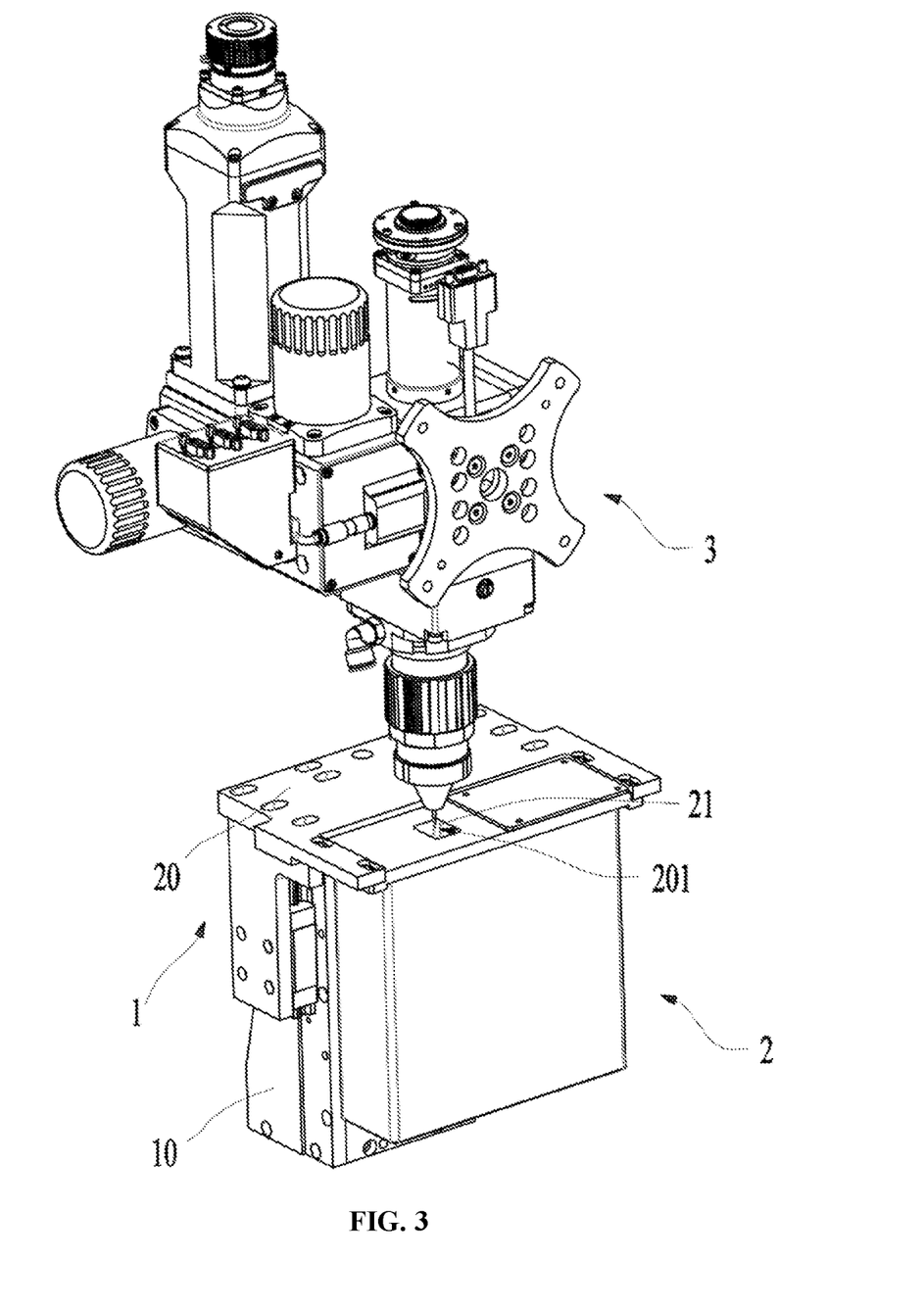
FIG. 3 is a schematic diagram of application of the protective apparatus shown in FIG. 2.

As shown in FIG. 1 to FIG. 3, a protective apparatus 1 provided in an embodiment of this application is configured to protect a to-be-welded part, where the to-be-welded part includes a welding region. The protective apparatus 1 includes a base 10 and a protective mechanism 20. The base 10 is configured for embedding the to-be-welded part. The protective mechanism 20 is connected to the base 10, where the protective mechanism 20 includes a welding hole 201, the welding hole 201 is provided corresponding to the welding region, a surface of the protective mechanism 20 facing the welding hole 201 is provided with a thermally conductive coating 21, and the thermally conductive coating 21 is configured to guide substances formed in welding the to-be-welded part to slide down along the surface of the thermally conductive coating 21.

The to-be-welded part may be a battery cell 2 (for example, welding of an end cover 212 of the battery cell 2) or may be a battery (for example, welding of a busbar or electrode terminal of a battery). Certainly, the to-be-welded part may alternatively be a to-be-welded device in a field other than the battery field, for example, a device in the fields of ships or bridges. The above examples are only illustrative of the to-be-welded part and are not intended to limit the scope of the embodiments of this application.

The battery cell 2 includes a housing assembly 210, an electrode assembly 220, and electrode terminals 213. The housing assembly 210 includes a housing 211 and an end cover 212. The housing 211 has an opening, the electrode assembly 220 is accommodated in the housing 211, and the end cover 212 covers the opening. The electrode terminals 213 are mounted on the end cover 212.

The base 10 is configured for embedding the to-be-welded part and provides a space for accommodating the to-be-welded part.

The protective mechanism 20 includes the welding hole 201. The welding hole 201 is provided corresponding to the welding region and also corresponding to an external welding device 3. For example, the external welding device 3 is a laser welding device. The laser welding device emits lasers, and the lasers pass through the welding hole 201 and reach the welding region. The welding hole 201 does not block the laser transmission path. In addition, the rest of the protective mechanism 20 other than the welding hole 201 can protect the to-be-welded part, which to some extent prevents the lasers from interfering with a non-welding region. In other words, with the welding hole 201 provided, the protective mechanism 20 can improve welding accuracy of the welding region.

In the process of welding the to-be-welded part, the molten metal may produce substances such as spatters. To reduce the risk of such substances adhering to the surface of the protective mechanism 20 facing the welding hole 201, in this embodiment of the application, the thermally conductive coating 21 is provided on the surface of the protective mechanism 20 facing the welding hole 201, where the thermally conductive coating 21 has high thermal conductivity. When the substances such as spatters splash onto the thermally conductive coating 21, heat carried by the spatters can be rapidly conducted through the thermally conductive coating 21, and thus the spatters are cooled and solidified into a solid or semi-solid state. In addition, the surface of the thermally conductive coating 21 is smooth, and therefore the substances are not prone to adhere to the thermally conductive coating 21. Under the action of gravity, the substances slide along the surface of the thermally conductive coating 21 to the welding region to serve as welding materials to be fused with the to-be-welded part, thereby improving the utilization of welding materials.

The protective apparatus 1 in this embodiment of this application includes the protective mechanism 20, and the surface of the protective mechanism 20 facing the welding hole 201 is provided with the thermally conductive coating 21, so that after being in contact with the thermally conductive coating 21, the substances such as spatters formed in the welding process can transfer heat to the thermally conductive coating 21 and are rapidly cooled and solidified. The cooled and solidified substances can slide along the smooth surface of the thermally conductive coating 21 under the action of gravity, so as to reduce the risk of the substances such as spatters adhering to the thermally conductive coating 21, prolonging the service life of the protective mechanism 20. Furthermore, the spatters hardly interfere with the welding process of the welding device 3, which can improve the welding effect. In addition, sliding to the welding region, the sliding substances continue to be used as welding materials for welding, reducing the possibility of false welding, which can further improve the welding quality of the welding region, thereby improving the performance of the to-be-welded part.

In some embodiments, the thermally conductive coating 21 is a metal ceramic coating or a non-metal ceramic coating. With high thermal conductivity, the ceramic coating can rapidly cool and solidify the substances such as spatters. In addition, the ceramic coating has excellent high-temperature resistance, therefore can withstand high temperatures in the welding process and is less likely to deform in the welding process, and therefore can protect other parts of the protective mechanism 20, reducing the frequency of replacing the protective apparatus 1. In addition, the ceramic coating has an excellent self-cleaning function.

For example, the metal ceramic coating may be an aluminum nitride AlN ceramic coating or a beryllium oxide BeO ceramic coating. This type of metal ceramic coating has high thermal conductivity and excellent self-cleaning performance.

For example, the non-metal ceramic coating may be a silicon carbide SiC ceramic coating or a silicon nitride SiN ceramic coating. This type of non-metal ceramic coating has high thermal conductivity and excellent high-temperature resistance performance.

Figure 4:
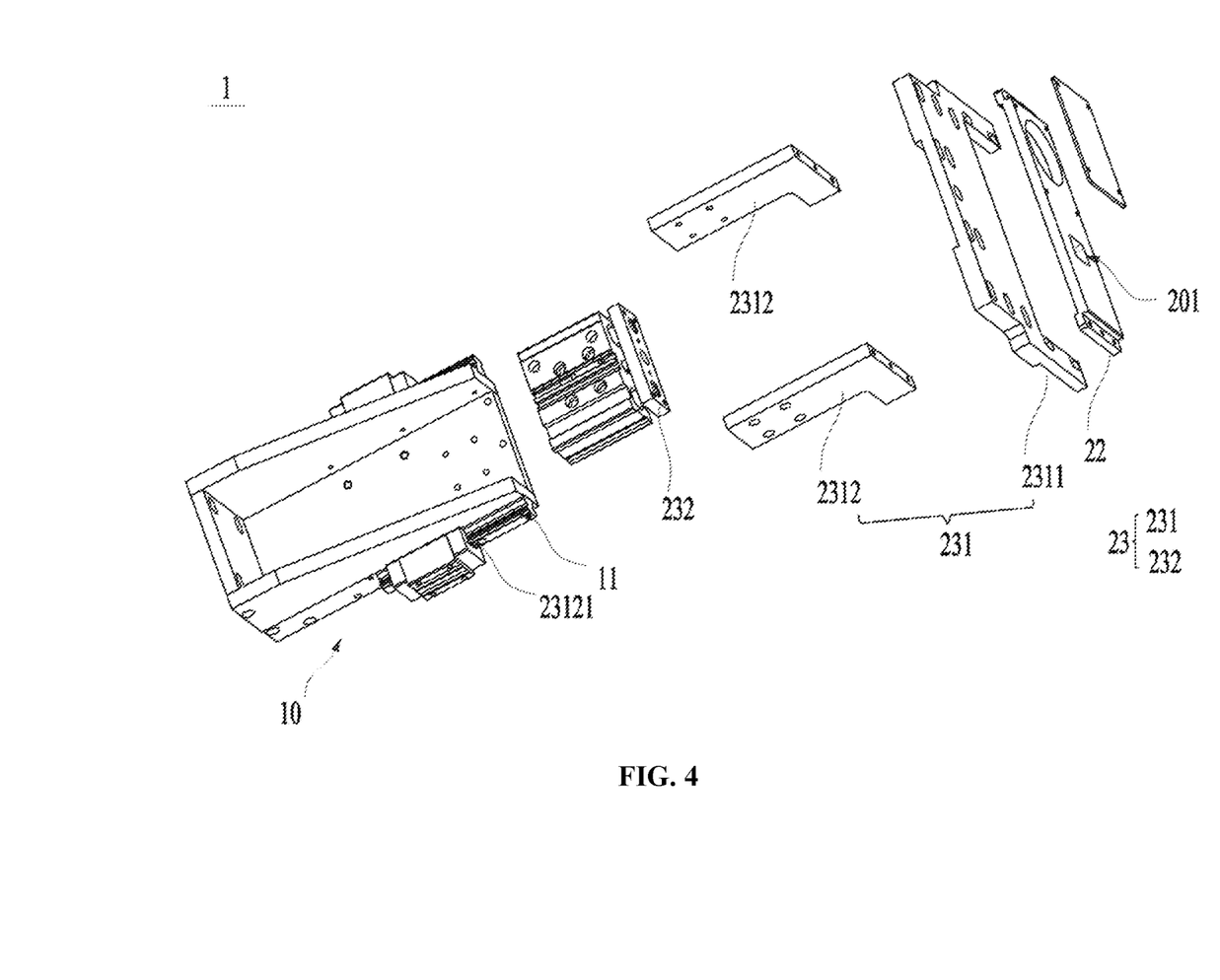
FIG. 4 is a schematic exploded view of a protective apparatus according to some embodiments of this application.
Figure 5:
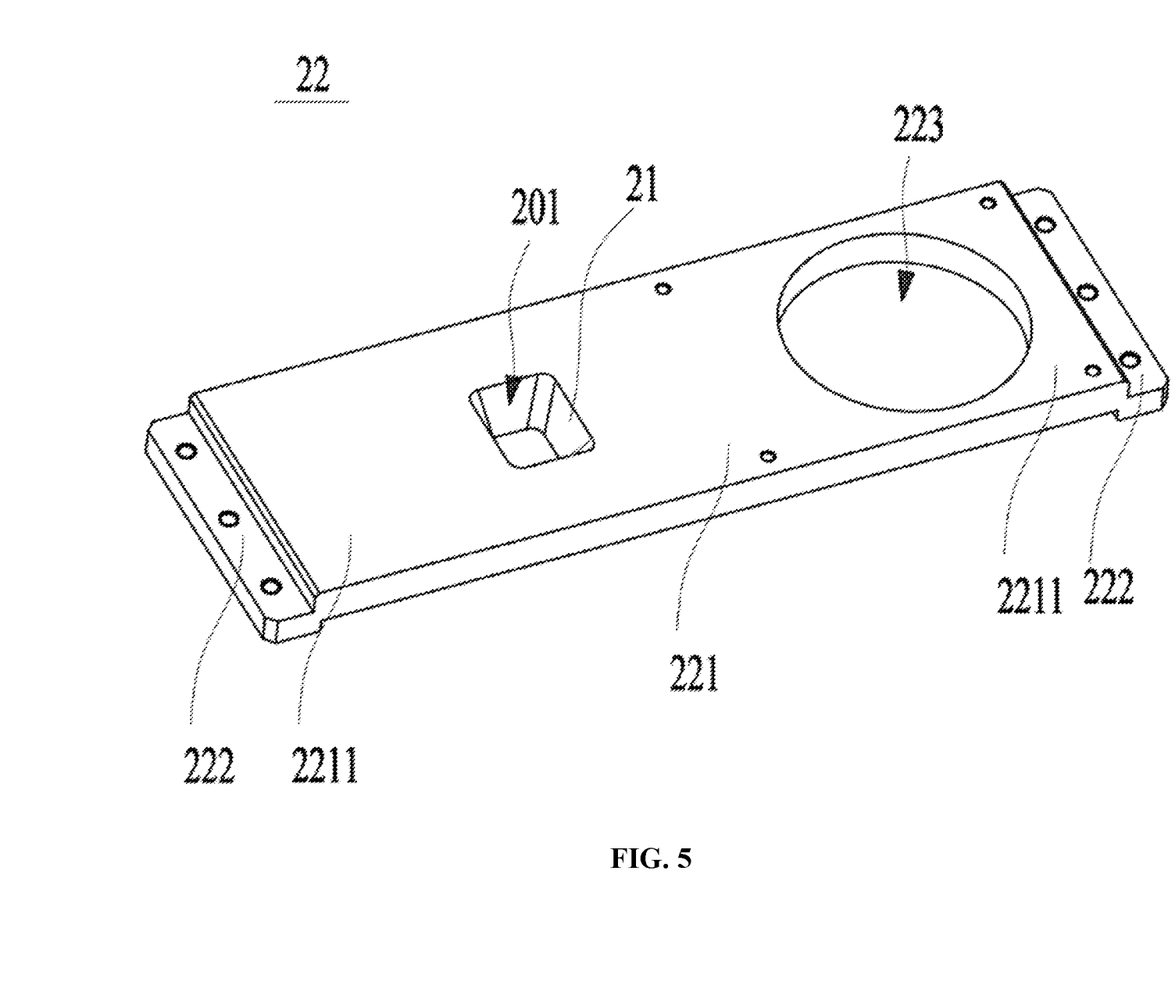
FIG. 5 is a schematic structural diagram of a protective body of a protective apparatus according to some embodiments of this application.

In some embodiments, as shown in FIG. 4 and FIG. 5, the protective mechanism 20 includes a protective body 22 and a connecting member 23. The protective body 22 is provided with the welding hole 201. The connecting member 23 includes a connecting piece 231 and a driving mechanism 232 connected to the base 10, where the connecting piece 231 is connected to the protective body 22 and movably connected to the base 10, and the driving mechanism 232 is drivingly connected to the connecting piece 231 and configured to drive the connecting piece 231 to move relative to the base 10 to drive the protective body 22 to move toward or away from the to-be-welded part. The driving mechanism 232 is connected to the base 10. In other words, the base 10 provides a foundation for mounting the driving mechanism 232. The connecting piece 231 acts as an intermediary, and the driving mechanism 232 drives the connecting piece 231 to drive the protective body 22 to move. For example, the driving mechanism 232 is a pneumatic cylinder or an electric cylinder.

In the embodiment of this application, provision of the driving mechanism 232 to drive the connecting piece 231 to drive the protective body 22 to move allows accurate control on a moving distance of the protective body 22. Before welding, the protective body 22 is driven to move toward the to-be-welded part to be in contact with the to-be-welded part, and after the welding is completed, the protective body 22 is driven to move away from the to-be-welded part.

The protective body 22 can cover the entire surface including the welding region, preventing adverse effects of the welding process on the non-welding region to some extent, for example, reducing the risk of the substances such as spatters splashing to the non-welding region. The protective body 22 can be adaptively provided according to a contour of the to-be-welded part. For example, if the to-be-welded part is an end cover of a battery cell, the protective body 22 can be of a plate structure to cover the end cover. Certainly, the protective body 22 may alternatively be of another structure.

Continue referring to FIG. 4 and FIG. 5. In some examples, the protective body 22 includes a body portion 221 and limiting portions 222. The body portion 221 includes two end portions 2211 opposite each other and the welding hole 201 located between the two end portions 2211, where the welding hole 201 runs through the body portion 221. The limiting portions 222 are connected to and protrude from the end portions 2211, where the limiting portions 222 are configured to limit the to-be-welded part. The body portion 221 may be opposite the to-be-welded part to cover the surface including the welding region. The limiting portions 222 protruding from the end portions 2211 to limit the to-be-welded part can reduce the risk of movement of the to-be-welded part, thereby improving the welding accuracy of the to-be-welded part.

The quantity of limiting portions 222 may vary correspondingly with the structure of the to-be-welded part. For example, if the to-be-welded part is a battery cell, the welding region is at the end cover of the battery cell, and the end cover is of a cuboid structure, two limiting portions 222 may be provided along a length direction of the end cover. An accommodating space can be formed between the two limiting portions 222 and the body portion 221, the end cover is accommodated in the accommodating space, and the two limiting portions 222 can limit two ends of the end cover in a length direction, which to some extent prevents the end cover from moving along the length direction. Certainly, the limiting portions 222 may be provided in a quantity of three, four, or the like. For example, limiting portions 222 may also be provided in a width direction of the end cover to prevent, to some extent, the end cover from moving along the width direction.

The to-be-welded part may include a protrusion protruding from the welding region. In this case, the protrusion may interfere with the protective body 22 because a gap is present between the protective body 22 and the welding region. The gap may cause the substances such as spatters to splash onto the surface of the protective body 22 facing the to-be-welded part, or even to the non-welding region of the to-be-welded part, adversely affecting both the to-be-welded part and the protective apparatus 1.

To further improve the welding quality of the to-be-welded part, in some embodiments, the body portion 221 may further include an escape portion 223. The escape portion 223 is provided corresponding to the protrusion so that at least part of the protrusion is embedded into the escape portion 223. In this way, the body portion 221 can be closer to the surface of the to-be-welded part, the protrusion hardly interferes with the welding process, and most substances such as spatters splash into the welding hole 201 and slide down.

The escape portion 223 may be an escape hole or an escape groove, and a specific structure may be determined according to actual product requirements. If the escape portion 223 is an escape hole, a cover plate may be further provided on the escape hole to reduce adverse effects of an external environment on the to-be-welded part, for example, to reduce the risk of external dust and the like falling to a region of the to-be-welded part corresponding to the escape hole.

For example, the to-be-welded part is an end cover, the welding region is an injection hole region on the end cover, and two electrode terminals are provided on the end cover, the electrode terminals protruding from the injection hole region. The body portion 221 is provided with two escape portions 223 corresponding to the electrode terminals, so as to avoid the electrode terminals. One escape portion 223 has a larger distance with the injection hole region, and this escape portion 223 can be provided as an escape hole or an escape groove. The other escape portion 223 has a smaller distance with the injection hole region and the injection hole region is provided corresponding to the welding hole 201. Therefore, if the other escape portion 223 is provided as a through hole, the escape portion 223 may communicate with the welding hole 201, which is equivalent to enlarging the area of the welding hole 201, adversely affecting the non-welding region. Therefore, the other escape portion 223 can be provided as an escape groove to reduce the risk of adversely affecting the non-welding region.

The protective body 22 is connected to the connecting piece 231, so that the driving mechanism 232 can drive, through the connecting piece 231, the protective body 22 to move. The protective body 22 can be fixedly or detachably connected to the connecting piece 231.

If the protective body 22 is fixedly connected to the connecting piece 231, an overall structure formed by the protective body 22 and the connecting member 23 has high stability, and movement of the connecting piece 231 and the protective mechanism 20 driven by the driving mechanism 232 is stable, which can further improve the accuracy of a moving distance.

The welding hole 201 provided on the protective body 22 is provided corresponding to the welding device and the welding region, and accordingly, the protective body 22 is more likely to be affected by the welding device or to-be-welded part, making the protective body 22 more likely a vulnerable part. Compared with the connecting member 23, the protective body 22 has a shorter service life and a higher replacement frequency. In this embodiment of this application, the protective body 22 is detachably connected to the connecting piece 231, so that the protective body 22 can be separated from the connecting member 23. This allows independent replacement of the protective body 22 without replacing the connecting member 23, thereby reducing a frequency of replacing the connecting member 23 and prolonging the service life of the connecting member 23. In addition, the protective body 22 can be flexibly selected according to a size of the to-be-welded part, without changing the overall structure of the protective apparatus 1. For example, before welding, the protective body 22 that matches the to-be-welded part is selected, then the protective body 22 is connected to the connecting piece 231, and after the connection is completed, driven by the driving mechanism 232, the protective body 22 approaches the to-be-welded part; and after the welding is completed, the protective body 22 is separated from the connecting piece 231 for the next welding.

Continue referring to FIG. 4 and FIG. 5. In some examples, the connecting piece 231 includes a first connecting piece 2311 and two second connecting pieces 2312. The first connecting piece 2311 is connected to the protective body 22 and drivingly connected to the driving mechanism 232. The two second connecting pieces 2312 are respectively connected, at one end, to two ends of the first connecting piece 2311, and the two second connecting pieces 2312 are movably connected, at the other end, to the base 10. The driving mechanism 232 is located between the two second connecting pieces 2312. For example, the first connecting piece 2311 and the second connecting pieces 2312 may all be of a plate structure. With this simple structure, the connecting pieces are easy to assemble. The first connecting piece 2311 and the second connecting pieces 2312 may be threadedly connected or certainly, welded.

The driving mechanism 232 is located between the two second connecting pieces 2312, and the two ends of the first connecting piece 2311 are movably connected to the base 10 through the two second connecting pieces 2312 respectively. When the driving mechanism 232 drives the first connecting piece 2311 to move, the two ends of the first connecting piece 2311 apply action force to the two second connecting pieces 2312 respectively, and correspondingly, the two ends of the first connecting piece 2311 receive reaction force from the two second connecting pieces 2312 respectively. During the movement of the first connecting piece 2311, the two ends of the first connecting piece 2311 are subject to basically even forces, and therefore the movement is stable, further improving the accuracy of a moving distance.

In some embodiments, the two second connecting pieces 2312 are respectively connected, at the other end, to two opposite outer surfaces of the base 10, and the driving mechanism 232 is disposed in the base 10. Disposition of the driving mechanism 232 in the base 10 can reduce interference of movement of the second connecting pieces 2312 on the driving mechanism 232.

Figure 6:
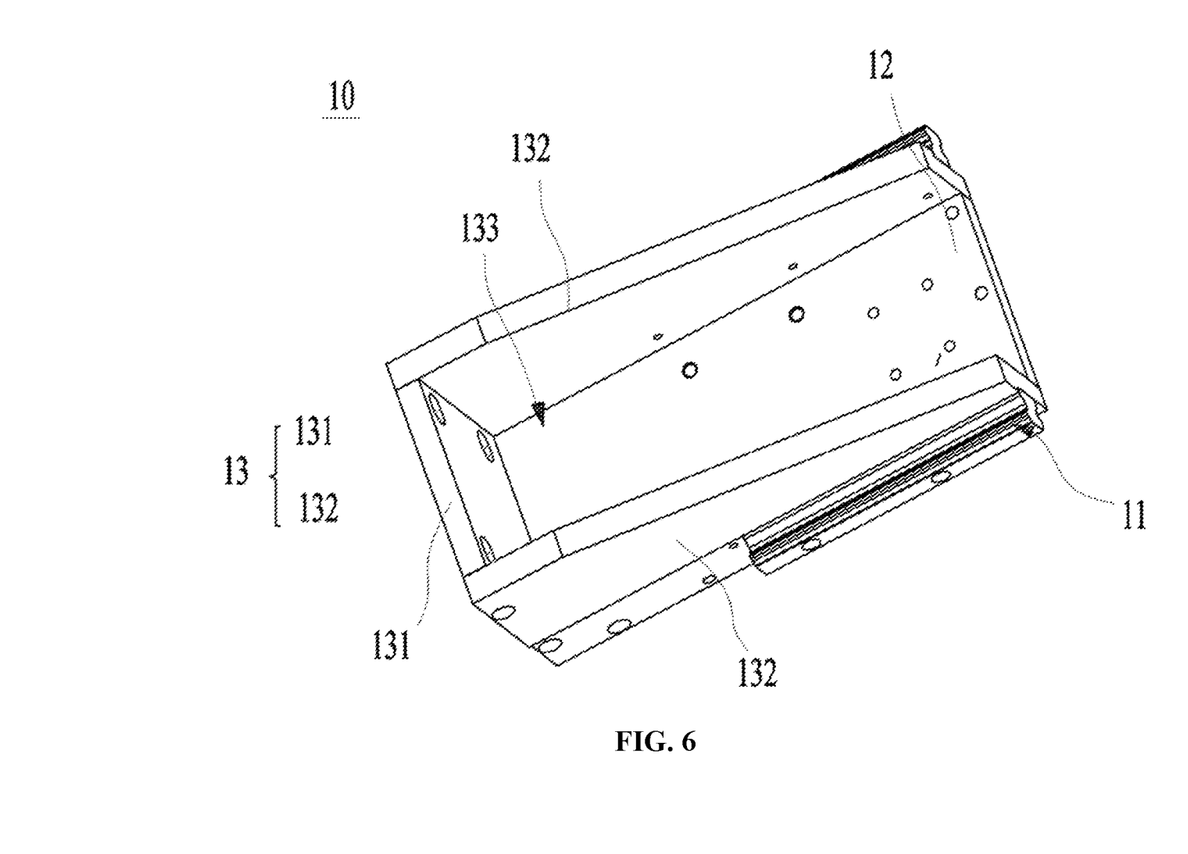
FIG. 6 is a schematic structural diagram of a base of a protective apparatus according to some embodiments of this application.

In some embodiments, the base 10 includes a guide rail 11, and the second connecting piece 2312 includes a moving groove 23121 corresponding to the guide rail 11. The second connecting pieces 2312 are adaptively connected to the guide rail 11 through the moving groove 23121, and the second connecting pieces 2312 can move along the guide rail 11. Therefore, the movement is stable, improving the accuracy of the moving distance.

Corresponding to the second connecting pieces 2312, two guide rails 11 may be provided. The two guide rails 11 are oppositely disposed outside the base 10, which can reduce the risk of interference between the guide rails 11 and the driving mechanism 232.

Continue referring to FIG. 4 and FIG. 5. In some embodiments, a cross-sectional area of the welding hole 201 gradually decreases in a direction toward the welding region, where the direction toward the welding region is parallel to a normal to the cross-sectional area.

The cross-sectional area of the welding hole 201 gradually decreases in a direction toward the welding region, so that on one hand, the welding hole 201 fits a welding joint of the welding device, and on the other hand, the welding hole 201 of this form can prevent interference to the non-welding region.

In some embodiments, as shown in FIG. 6, the base 10 includes a main body 12 and three extensions 13. The three extensions 13 protrude from the main body 12 toward a same direction. The three extensions 13 include a first extension plate 131 and two opposite second extension plates 132, and the first extension plate 131 is disposed between the two second extension plates 132. The main body 12, the first extension plate 131, and the two second extension plates 132 enclose an accommodating cavity 133 with an opening, where the accommodating cavity 133 is used to accommodate the to-be-welded part, and the connecting piece 231 covers the opening. The accommodating cavity 133 being adapted to a contour shape of the to-be-welded part and the three extensions 13 protruding from the main body 12 toward a same direction facilitate embedding of the to-be-welded part into the accommodating cavity 133. In addition, the first extension plate 131 and the two second extension plates 132 are all of a plate structure. With this simple structure, the extension plates can be connected in a manner of bonding, welding, or the like.

For example, the to-be-welded part is a battery cell and the welding region is on an end cover. A housing of the battery cell includes a bottom and a side, where the bottom is disposed opposite the end cover, and the side is located between the bottom and the end cover. The battery cell is located in the accommodating cavity 133, with the bottom opposite the first extension plate 131, the side opposite the second extension plate 132, and the end cover opposite the protective body 22.

As shown in FIG. 1 to FIG. 6, in a specific embodiment of this application, a protective apparatus 1 includes a base 10 and a protective mechanism 20. The base 10 includes an accommodating cavity 133. The protective mechanism 20 includes a protective body 22 provided with a welding hole 201 and a connecting member 23. The connecting member 23 includes a connecting piece 231 connected to the protective body 22 and a driving mechanism 232 connected to the base 10. The protective body 22 is detachably connected to the connecting piece 231. The protective body 22 further includes an escape portion 223.

A to-be-welded part is a battery cell 2, a welding region is at an end cover 212 of the battery cell 2, and electrode terminals 213 provided on the end cover 212 are corresponding to the escape portion 223. Before welding, the protective body 22 that matches the specifications of the battery cell 2 is selected, then the protective body 22 is connected to the connecting piece 231, and then the battery cell 2 is placed in the accommodating cavity 133. Driven by a driving mechanism 232, the connecting piece 231 drives the protective body 22 to move toward the battery cell 2, so that the protective body 22 approaches the end cover 213. A welding device 3 emits lasers, and the lasers pass through the welding hole 201 and reach the welding region. After the welding is completed, driven by the driving mechanism 232, the connecting piece 231 drives the protective body 22 to move away from the battery cell 2, and then the battery cell 2 is taken out.

Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this application, but includes all technical solutions falling within the scope of the claims.

What is claimed is:

1. A protective apparatus, configured to protect a to-be-welded part, the to-be-welded part comprising a welding region, the protective apparatus comprising:
    a base, configured for embedding the to-be-welded part; and
    a protective mechanism, connected to the base, the protective mechanism comprising a welding hole, wherein the welding hole is provided corresponding to the welding region; and a surface of the protective mechanism facing the welding hole being provided with a thermally conductive coating, wherein the thermally conductive coating is configured to guide substances formed in welding the to-be-welded part to slide down along the surface of the thermally conductive coating and, wherein the protective apparatus further comprises:
    a protective body, provided with the welding hole; and
    a connecting member, comprising a connecting piece and a driving mechanism connected to the base, wherein the connecting piece is connected to the protective body and movably connected to the base, and the driving mechanism is drivingly connected to the connecting piece and configured to drive the connecting piece to move relative to the base so as to drive the protective body to move toward or away from the to-be-welded part.

2. The protective apparatus according to claim 1, wherein:
    the thermally conductive coating is a metal ceramic coating or a non-metal ceramic coating.

3. The protective apparatus according to claim 1, wherein the protective body comprises:
    a body portion, comprising two end portions opposite each other and the welding hole located between the two end portions, wherein the welding hole runs through the body portion; and
    limiting portions, connected to and protruding from the end portions, wherein the limiting portions are configured to limit the to-be-welded part.

4. The protective apparatus according to claim 3, wherein:
    the to-be-welded part comprises a protrusion protruding from the welding region; and the body portion comprises an escape portion, wherein the escape portion is provided corresponding to the protrusion to allow at least part of the protrusion to be embedded into the escape portion.

5. The protective apparatus according to claim 1, wherein the connecting piece comprises:
    a first connecting piece connected to the protective body, wherein the first connecting piece is drivingly connected to the driving mechanism; and
    two second connecting pieces, wherein the two second connecting pieces are respectively connected, at one end, to two ends of the first connecting piece, and the two second connecting pieces are movably connected, at the other end, to the base; and the driving mechanism is located between the two second connecting pieces.

6. The protective apparatus according to claim 5, wherein:
    the two second connecting pieces are respectively connected, at the other end, to two opposite outer surfaces of the base; and
    the driving mechanism is disposed in the base.

7. The protective apparatus according to claim 5, wherein:
    the base comprises a guide rail, and the second connecting piece comprises a moving groove corresponding to the guide rail.

8. The protective apparatus according to claim 1, wherein the base comprises:
    a main body; and
    three extensions protruding from the main body toward a same direction, wherein the three extensions comprise a first extension plate and two opposite second extension plates, and the first extension plate is disposed between the two second extension plates; wherein
    the main body, the first extension plate and the two second extension plates enclose an accommodating cavity with an opening, wherein the accommodating cavity is used to accommodate the to-be-welded part, and the connecting piece covers the opening.

9. The protective apparatus according to claim 1, wherein:
    a cross-sectional area of the welding hole gradually decreases in a direction toward the welding region, wherein the direction toward the welding region is parallel to a normal to the cross-sectional area.

\* \* \* \* \*